(12) United States Patent
Shin et al.

(10) Patent No.: US 11,008,431 B2
(45) Date of Patent: *May 18, 2021

(54) METHOD FOR PREPARING A BARRIER FILM

(71) Applicant: LG CHEM, LTD., Seoul (KR)

(72) Inventors: Sung Jin Shin, Daejeon (KR); Dong Ryul Kim, Daejeon (KR); Jang Yeon Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 161 days.

This patent is subject to a terminal disclaimer.

(21) Appl. No.: 16/089,746

(22) PCT Filed: Mar. 31, 2017

(86) PCT No.: PCT/KR2017/003574
§ 371 (c)(1),
(2) Date: Sep. 28, 2018

(87) PCT Pub. No.: WO2017/171488
PCT Pub. Date: Oct. 5, 2017

(65) Prior Publication Data
US 2019/0106595 A1   Apr. 11, 2019

(30) Foreign Application Priority Data
Mar. 31, 2016  (KR) .................. 10-2016-0039684

(51) Int. Cl.
| | | |
|---|---|---|
| C08J 7/048 | (2020.01) | |
| C08J 7/04 | (2020.01) | |
| B05D 7/04 | (2006.01) | |
| B05D 7/26 | (2006.01) | |
| B05D 3/14 | (2006.01) | |
| C08L 83/08 | (2006.01) | |
| C08G 77/62 | (2006.01) | |
| C08J 7/043 | (2020.01) | |
| C08J 7/046 | (2020.01) | |
| C08J 7/12 | (2006.01) | |
| C09D 183/16 | (2006.01) | |
| C08G 77/00 | (2006.01) | |

(52) U.S. Cl.
CPC ............. *C08J 7/048* (2020.01); *B05D 3/148* (2013.01); *B05D 7/04* (2013.01); *B05D 7/26* (2013.01); *C08G 77/62* (2013.01); *C08J 7/042* (2013.01); *C08J 7/043* (2020.01); *C08J 7/046* (2020.01); *C08J 7/123* (2013.01); *C08L 83/08* (2013.01); *C09D 183/16* (2013.01); *C08G 77/70* (2013.01); *C08G 2150/00* (2013.01); *C08J 2383/16* (2013.01)

(58) Field of Classification Search
CPC ..... C23C 18/14; C23C 16/308; C23C 16/345; C23C 16/401; C23C 16/402; H01J 37/00; H01J 2237/332; H01J 2237/336; H01J 2237/3365; H01J 2237/338; H01J 2237/3382; B05D 1/62; B05D 3/0406; B05D 3/046; B05D 3/145; B05D 3/147; B05D 3/148; B05D 7/04; B05D 7/26; C08J 7/123; C08J 7/18; C08J 2483/00; C08J 2483/16; C08J 2383/00; C08J 2383/16; B32B 27/08; B32B 27/18; B32B 27/26; B32B 27/28; B32B 38/0008; C09D 183/16; C08G 77/62; C08G 77/70; C08G 2150/00
USPC ........ 427/489, 491, 535, 536, 539, 578, 579
See application file for complete search history.

(56) References Cited

U.S. PATENT DOCUMENTS

| | | | | |
|---|---|---|---|---|
| 8,557,712 | B1 * | 10/2013 | Antonelli | ............. C23C 16/045 |
| | | | | 257/E21.26 |
| 9,837,270 | B1 * | 12/2017 | Varadarajan | ...... H01L 21/76826 |
| 10,323,317 | B2 * | 6/2019 | Suzuki | ....................... B32B 7/00 |
| 2007/0281105 | A1 * | 12/2007 | Mokhlesi | .......... C23C 16/45536 |
| | | | | 427/569 |
| 2012/0107607 | A1 | 5/2012 | Takaki et al. | |
| 2012/0184107 | A1 * | 7/2012 | Sato | .................. H01L 21/02236 |
| | | | | 438/703 |
| 2013/0288485 | A1 * | 10/2013 | Liang | .................... H01J 37/321 |
| | | | | 438/782 |
| 2015/0166751 | A1 | 6/2015 | Fukumoto et al. | |

(Continued)

FOREIGN PATENT DOCUMENTS

| | | | | |
|---|---|---|---|---|
| JP | H10194873 | | 7/1998 | |
| JP | 2000-246830 | A * | 9/2000 | ............. C23C 14/12 |
| JP | 2007237588 | | 9/2007 | |

(Continued)

OTHER PUBLICATIONS

Machine translation of JP 2011-036779 A, published Feb. 24, 2011, inventors I. Hiromoto; "Method of Manufacturing Gas Barrier Film And Organic Photoelectric Conversion Element".*

(Continued)

*Primary Examiner* — Michael P Wieczorek

(74) *Attorney, Agent, or Firm* — Dentons US LLP

(57) ABSTRACT

The present application relates to a method for preparing a barrier film. The present application can provide a method for preparing a barrier film having excellent barrier characteristics and optical performances. The barrier film produced by the method of the present application can be effectively used not only for packaging material for food or medicine, and the like, but also for various applications, such as LCDs (Liquid Crystal Displays) or a solar cells, substrates for electronic papers or OLEDs (Organic Light Emitting Diodes) or sealing films.

10 Claims, No Drawings

(56) References Cited

U.S. PATENT DOCUMENTS

2015/0331153 A1    11/2015  Kang et al.
2016/0076133 A1*   3/2016   Suzuki ...................... B32B 7/00
                                                           428/448

FOREIGN PATENT DOCUMENTS

| | | | | |
|---|---|---|---|---|
| JP | 2010137372 | | 6/2010 | |
| JP | 2011036779 | | 2/2011 | |
| JP | 2011143550 | | 7/2011 | |
| KR | 10-2009-0019059 A | * | 2/2009 | ............ B23B 33/00 |
| KR | 10-2009-0019226 A | * | 2/2009 | ............ C03C 17/30 |
| KR | 10-2011-0080810 | | 7/2011 | |
| KR | 10-2012-0031228 | | 3/2012 | |
| KR | 10-2014-0036049 | | 3/2014 | |
| KR | 10-2014-0087412 | | 7/2014 | |

OTHER PUBLICATIONS

Machine translation of JP 2007-237588 A, published Sep. 20, 2007; inventors Morinaka Yuriko et al.; "Gas-Barrier Film and Method for Producing the Film".*

Humidity Calculator; online calculation tool found at www.Aqua-Calc.comms/calculate/humidity; information retrieved May 1, 2020.*

U.S. Pat. No. 10,654,070 issuing May 19, 2020; Wang et al. (belongs above under US patent documents, but computer won't allow it to be listed at this time).*

International Search Report and the Written Opinion of PCT/KR2017/003574, dated Jul. 11, 2017.

* cited by examiner

METHOD FOR PREPARING A BARRIER FILM

This application is a National Stage Application of International Application No. PCT/KR2017/003574 filed on Mar. 31, 2017, which claims priority to and the benefit of Korean Patent Application No. 10-2016-0039684 filed on Mar. 31, 2016, the disclosure of which is incorporated herein by reference in its entirety for all purposes as if fully set forth herein.

TECHNICAL FIELD

The present application relates to a method for preparing a barrier film.

BACKGROUND ART

Barrier films for blocking external components such as oxygen and moisture are used not only for packaging materials of foods or medicines, and the like which are conventional main applications, but also members for FPDs (flat panel displays) such as LCDs (Liquid Crystal Displays) or solar cells, substrates for electronic papers or OLEDs (Organic Light Emitting Diodes) or sealing films, and the like.

In the applications, high barrier characteristics are required, and from the viewpoint of performance guarantee, moisture-heat resistance, in which the barrier characteristics are not lowered even after being left under moisture and heat conditions, and the like are also required.

As one of methods for preparing barrier films by a wet method, there is known a method of converting a polysilazane layer coated on a base material film to silica. In this method, the polysilazane can be converted to silica by being heat-treated in the presence of oxygen or water vapor, or through hydrolysis or dehydration polycondensation.

For example, in Patent Document 1, a method is described, in which perhydropolysilazane or a modified product thereof is applied to a base material film and calcined under vacuum.

PRIOR ART DOCUMENT

Patent Document (Patent Document 1) Japanese Unexamined Patent Publication No. H10-194873

DISCLOSURE

Technical Problem

The present application provides a method for preparing a barrier film.

Technical Solution

The present application relates to a method for preparing a barrier film. In the present application, the term barrier film may mean a film having an intended range of water vapor transmission rate (WVTR). For example, the barrier film may mean a layer having a water vapor transmission rate, at a temperature of 40° C. and a relative humidity of 90%, of 10 mg/m²/day or less, 9 mg/m²/day or less, 8 mg/m²/day or less, 7 mg/m²/day or less, 6 mg/m²/day or less, 5 mg/m²/day or less, 4 mg/m²/day or less, 3 mg/m²/day or less, 2.5 mg/m²/day or less, 2 mg/m²/day or less, 1 mg/m²/day or less, 0.5 mg/m²/day or less, 0.3 mg/m²/day or less, or 0.1 mg/m²/day or less. Since the water vapor transmission rate means that the lower the value thereof, the relevant layer exhibits more excellent barrier characteristics, the lower limit of the water vapor transmission rate is not particularly limited. In one example, the lower limit of the water vapor transmission rate is at least 0.001 mg/m²/day, at least 0.005 mg/m²/day, at least 0.01 mg/m²/day, at least 0.02 mg/m²/day, at least 0.03 mg/m²/day, at least 0.04 mg/m²/day, at least 0.05 mg/m²/day, or at least 0.06 mg/m²/day. The water vapor transmission rate can be measured, for example, according to ISO 15106-3 or ASTM F-1249 standard.

An exemplary preparation method may comprise a step of plasma-treating the polysilazane layer in the processing space to modify it.

In this specification, the term polysilazane layer means a layer comprising polysilazane as a main component. Here, the main component may mean the case where the ratio of polysilazane in the relevant polysilazane layer is 55% or more, 60% or more, 65% or more, 70% or more, 75% or more, 80% or more, 85% or more, or 90% or more on the basis of weight. The weight ratio may be, for example, 100% or less, 99% or less, 98% or less, 97% or less, 96% or less, or 95% or less.

In the present application, the term polysilazane means a polymer in which silicon atoms and nitrogen atoms are repeated to form a basic backbone. This polysilazane can be modified to form silicon oxide or silicon oxynitride having barrier characteristics.

In one example, the polysilazane used in the present application may comprise units represented by the following Formula 1.

[Formula 1]

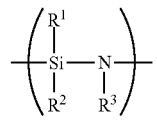

In Formula 1, $R^1$, $R^2$ and $R^3$ may each independently be a hydrogen atom, an alkyl group, an alkenyl group, an alkynyl group, an aryl group, an alkylsilyl group, an alkylamido group or an alkoxy group.

In the present application, the term "alkyl group" may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched or cyclic. In addition, the alkyl group may be optionally substituted with one or more substituents.

In the present application, the term "alkoxy group" may mean an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be linear, branched or cyclic. In addition, the alkoxy group may be optionally substituted with one or more substituents.

In the present application, the term "alkenyl group" may mean an alkenyl group having 2 to 20 carbon atoms, 2 to 16 carbon atoms, 2 to 12 carbon atoms, 2 to 8 carbon atoms, or 2 to 4 carbon atoms, unless otherwise specified. The alkenyl group may be linear, branched or cyclic and may optionally be substituted with one or more substituents.

In the present application, the term "alkynyl group" may mean an alkynyl group having 2 to 20 carbon atoms, 2 to 16 carbon atoms, 2 to 12 carbon atoms, 2 to 8 carbon atoms, or 2 to 4 carbon atoms, unless otherwise specified. The alkynyl group may be linear, branched or cyclic and may optionally be substituted with one or more substituents.

The term "aryl group" herein may mean a monovalent residue derived from a compound comprising a structure in which a benzene ring or two or more benzene rings are linked, or condensed or bonded while sharing one or two or more carbon atoms, or a derivate thereof, unless otherwise specified. In this specification, the range of the aryl group may also include a so-called aralkyl group or an arylalkyl group, and the like as well as a functional group usually referred to as an aryl group. The aryl group may be, for example, an aryl group having 6 to 25 carbon atoms, 6 to 21 carbon atoms, 6 to 18 carbon atoms, or 6 to 12 carbon atoms. As the aryl group, a phenyl group, a dichlorophenyl group, a chlorophenyl group, a phenylethyl group, a phenylpropyl group, a benzyl group, a tolyl group, a xylyl group or a naphthyl group, and the like can be exemplified.

In the present application, polysilazane comprising units of Formula 1 wherein R1 to R3 are all a hydrogen atom, for example, perhydropolysilazane can be used in consideration of denseness of the modified polysilazane layer.

The polysilazane layer can be formed, for example, by coating a coating liquid (coating liquid comprising polysilazane), which is prepared by dissolving polysilazane in an appropriate organic solvent, on a base material film. The thickness of the polysilazane layer formed through such a process is controlled in consideration of the desired barrier characteristics, which is not particularly limited.

However, if the thickness of the polysilazane layer is too thin, the coating of the polysilazane layer is not smoothly performed depending on the unevenness state of the base material to be coated, so that the desired barrier characteristics are not ensured, and if the thickness is too thick, damage such as cracks may be caused due to shrinkage or the like of the polysilazane layer upon plasma treatment. Thus, for example, the thickness of the polysilazane layer may be selected as an appropriate range within a range of about 20 nm to 1,000 nm.

The type of the base material film on which the polysilazane layer is formed is not particularly limited. For example, a polyester film such as a polyethylene terephthalate (PET) film, a polycarbonate film, a polyethylene naphthalate film or a polyarylate film, a polyether film such as a polyethersulfone film, a polyolefin film such as a cycloolefin polymer film, a polyethylene film or a polypropylene film, a cellulose resin film such as a diacetylcellulose film, a triacetylcellulose film or an acetylcellulose butyrate film, a polyimide film, an acrylic film and an epoxy resin film, and the like can be exemplified. In the present application, the base material film may have a single layer or multilayer structure. The thickness of the base material film may also be appropriately selected depending on applications, and for example, may be selected within the range of from 2 μm to 200 μm, within the range of from 5 μm to 190 μm, within the range of 10 μm to 180 μm, within the range of 20 μm to 180 μm or within the range of 20 μm to 150 μm.

The inventors have confirmed that the modified polysilazane layer having significantly increased barrier characteristics is formed by plasma-treating the polysilazane layer as above under the condition that water vapor is present. Generally, when the water vapor is present on forming the modified polysilazane having barrier characteristics by modifying the polysilazane, Si—OH is produced to lower the barrier characteristics of the modified polysilazane, and thus, considering that it is known to have to perform the modification treatment under a low oxygen and low water vapor atmosphere in order to form the polysilazane having barrier characteristics, the above finding is surprising. When the modification treatment is performed under the water vapor atmosphere, the reason why the barrier characteristics are increased is not clear, but it is predicted that the hydrogen radicals dissociated from the water vapor in the processing space detach hydrogen atoms of the polysilazane and bond to them to form hydrogen ($H_2$), thereby increasing the reactivity of the polysilazane.

For example, the modification treatment of the polysilazane layer can be carried out while maintaining the vapor pressure of water vapor in the processing space at 5% or more. In this specification, the water vapor pressure may mean the percentage of the injection flow rate of the injected water vapor, relative to the total flow rate of the gases injected into the processing space. For example, in the case of performing the plasma treatment while injecting water vapor, a discharge gas and a reaction gas into the chamber, which is a processing space, at flow rates of A sccm, B sccm and C sccm, respectively, the water vapor pressure can be calculated as $100 \times A/(A+B+C)$. In another example, the water vapor pressure may be about 10% or more, about 15% or more, about 20% or more, about 25% or more, or about 30% or more. The upper limit of the water vapor pressure is not particularly limited and may be, for example, about 90% or less, about 85% or less, about 80% or less, about 75% or less, about 70% or less, about 65% or less, about 60% or less, about 55% or less, about 50% or less, about 45% or less, about 40% or less, or about 35% or less.

The manner of keeping the water vapor pressure in the processing space within the above-mentioned range is not particularly limited.

For example, the modification treatment can be performed while injecting water vapor, a discharge gas, and oxygen into the processing space, where the water vapor pressure can be controlled by controlling the injection flow rate. In an exemplary method, the modification treatment can be performed while injecting the water vapor at a flow rate of 50 sccm or more in the processing space. In another example, the injection flow rate of the water vapor may be 55 sccm or more, 60 sccm or more, 65 sccm or more, 70 sccm or more, 75 sccm or more, 80 sccm or more, 85 sccm or more, 90 sccm or more, 95 sccm or more, 100 sccm or more, 105 sccm or more, 110 sccm or more, 115 sccm or more, or 120 sccm or more. The upper limit of the injection flow rate is not particularly limited, and for example, the injection flow rate may be about 500 sccm or less, 400 sccm or less, 300 sccm or less, 200 sccm or less, or about 150 sccm or less.

The hydrogen partial pressure in the processing space can be controlled by maintaining the water vapor pressure as above in the processing space. As described above, the cause of increasing the barrier characteristics by the modification treatment under the water vapor atmosphere may include dehydrogenation of the polysilazane layer by the hydrogen radicals generated from the water vapor, whereby the hydrogen partial pressure in the processing space can be controlled. In one example, the partial pressure of hydrogen ($H_2$) in the processing space where the modification treatment is performed may be about $2.00 \times 10^{-5}$ Pa or more. The upper limit of the hydrogen partial pressure is not particularly limited and may be, for example, about $1.00 \times 10^{-4}$ Pa or less, about $9.00 \times 10^{-5}$ Pa or less, about $8.00 \times 10^{-5}$ Pa or less, about $7.00 \times 10^{-5}$ Pa or less, about $6.00 \times 10^{-5}$ Pa or less, about $5.00 \times 10^{-5}$ Pa or less, or about $4.50 \times 10^{-5}$ Pa or less.

This hydrogen partial pressure can be achieved through controlling the partial pressure of water vapor or the injection flow rate in the processing space, and in this range, a barrier film having excellent barrier characteristics can be obtained.

Under the conditions as above, a modification treatment, that is, a plasma treatment may be performed to modify the polysilazane and to form a barrier layer.

Here, the plasma treatment may be carried out by performing a plasma discharge treatment while supplying a discharge gas capable of forming a plasma state. Here, as the applicable discharge gas, nitrogen gas and/or the atom of Group 18 of the periodic table, for example, helium, neon, argon, krypton, xenon or radon, and the like can be used.

Accordingly, when the modification treatment is a plasma treatment, the modification treatment can be performed while injecting a discharge gas and water vapor into the processing space. As the discharge gas, the above-mentioned kind may be used.

When the discharge gas is injected, the ratio (H/N) of the injection flow rate (H) of the water vapor to the injection flow rate (N) of the discharge gas may be maintained at 0.4 or more. In another example, the ratio (H/N) may be maintained at about 0.45 or more or about 0.5 or more. The upper limit of the ratio (H/N) is not particularly limited and may be, for example, about 10 or less, about 9 or less, about 8 or less, about 7 or less, about 6 or less, about 5 or less, about 4 or less, about 3 or less, about 2 or less, about 1 or less, or about 0.9 or less. Under such a range, the modification treatment can be effectively performed.

The modification treatment can be performed while supplying oxygen having oxidation characteristics as a reaction gas into the processing space. Therefore, the modification treatment can be performed while injecting water vapor and oxygen into the processing space. In this case, the ratio (H/O) of the injection flow rate (H) of the water vapor to the injection flow rate (O) of the oxygen gas into the processing space may be about 0.4 or more. In another example, the ratio (H/O) may be maintained at about 0.45 or more or about 0.5 or more. The upper limit of the ratio (H/O) is not particularly limited and may be, for example, about 10 or less, about 9 or less, about 8 or less, about 7 or less, about 6 or less, about 5 or less, about 4 or less, about 3 or less, about 2 or less, about 1 or less, or about 0.9 or less. Under such a range, the modification treatment can be effectively performed.

The discharge condition for the modification treatment, that is, the plasma treatment, performed while injecting the water vapor, the discharge gas and/or the reaction gas as described above is not particularly limited and may be selected in consideration of the process efficiency or the like or the kinds and flow rates of the gases to be injected. For example, the plasma discharge treatment may be performed such that a power density per unit area of an electrode is about 0.2 W/cm$^2$ or more. In another example, the power density may be about 0.4 W/cm$^2$ or more, about 0.6 W/cm$^2$ or more, about 0.8 W/cm$^2$ or more, or about 0.9 W/cm$^2$ or more. In addition, the power density may be about 5 W/cm$^2$ or less, 4 W/cm$^2$ or less, 3 W/cm$^2$ or less, 2 W/cm$^2$ or 1.5 W/cm$^2$ or less.

However, the range of the power density is exemplary and the specific range can be determined depending on the desired processing energy and the composition of the barrier film to be processed, for example, the type of the base material film of the barrier film. That is, since the processing energy is determined by the product of the power density and the processing time, the power density is increased in order to secure the desired processing energy in a short time, and conversely, if the power density is lowered, the time for securing the processing energy becomes longer. However, if the power density is too high, damage (appearance distortion, etc.) of the base material film may occur depending on the kind of the base material film, and therefore, an appropriate range of power density can be selected in consideration of this. For example, in the case of a base material film having heat resistance or the like, the processing time required for securing the desired processing energy can be shortened by increasing the power density.

Furthermore, the processing energy upon the plasma treatment can be maintained at about 2 J/cm$^2$ or more. The processing energy may be 3 J/cm$^2$ or more, 4 J/cm$^2$ or more, 5 J/cm$^2$ or more, 6 J/cm$^2$ or more, 7 J/cm$^2$ or more, 8 J/cm$^2$ or more, 9 J/cm$^2$ or more, 10 J/cm$^2$ or more, 11 J/cm$^2$ or more, or 12 J/cm$^2$ or more. The processing energy may be 30 J/cm$^2$ or less, 28 J/cm$^2$ or less, 26 J/cm$^2$ or less, 24 J/cm$^2$ or less, 22 J/cm$^2$ or less, 20 J/cm$^2$ or less, 18 J/cm$^2$ or less, 16 J/cm$^2$ or less, or 14 J/cm$^2$ or less, but is not limited thereto.

The specific range of the processing energy can be changed in consideration of the state of the polysilazane layer to be treated, for example, its thickness and the like. In general, the thicker the thickness, the more energy is needed for the reaction, so that the amount of processing energy can be increased. However, even when the thickness of the polysilazane layer becomes too thick as described above, damage such as cracks can be caused, so that the above processing energy can also be adjusted according to the appropriate thickness of the polysilazane layer.

The process pressure upon the plasma treatment can be maintained in a range of 50 mTorr or more. In another example, the process pressure may be about 60 mTorr or more, 70 mTorr or more, 80 mTorr or more, 90 mTorr or more, 100 mTorr or more, or may be maintained in the range of about 500 mTorr or less, about 450 mTorr or less, about 400 mTorr or less, about 350 mTorr or less, or about 300 range of mTorr or less.

The temperature at which the plasma treatment is performed is not particularly limited, but it may be appropriate to perform at a temperature higher than room temperature because the reaction for formation of the barrier layer can be made smoother as the temperature rises. For example, the process temperature upon the modification treatment may be 30° C. or higher, 40° C. or higher, 50° C. or higher, 60° C. or higher, 70° C. or higher, or 80° C. or higher. In another example, the process temperature may be about 85° C. or higher, about 90° C. or higher, about 95° C. or higher, about 100° C. or higher, about 105° C. or higher, or about 110° C. or higher. The process temperature may be maintained at about 200° C. or less, about 190° C. or less, about 180° C. or less, about 170° C. or less, about 160° C. or less, about 150° C. or less, about 140° C. or less, about 130° C. or less, or about 120° C. or less.

The process pressure and the process temperature may be adjusted in consideration of the desired barrier characteristics and/or process efficiency, and the like.

The plasma processing time can be appropriately adjusted so that the barrier layer can exhibit proper barrier characteristics, and for example, can be performed for a time of about 10 seconds to 10 minutes or so. However, the processing time is an example, and the specific processing time may be determined in accordance with the power density or the like depending on the level of the desired processing energy as described above.

The modified polysilazane layer having barrier characteristics can be formed by modifying the polysilazane layer with the modification treatment under the above conditions.

The preparation method may further comprise a step of forming an intermediate layer on the base material film before forming the polysilazane layer. Such an intermediate layer can act, for example, as so-called dielectric layers or planarization layers. By further performing this step, a barrier film having a structure in which the intermediate layer and the modified polysilazane layer are formed on the base material film can be obtained.

The intermediate layer may comprise at least one selected from the group consisting of an acrylic resin, a urethane resin, a melamine resin, an alkyd resin, an epoxy resin, a siloxane polymer and/or a condensation product of an organosilane compound represented by the following Formula 2.

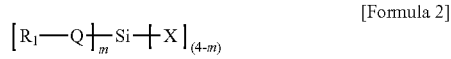
[Formula 2]

In Formula 2, X may be hydrogen, halogen, an alkoxy group, an acyloxy group, an alkyl carbonyl group, an alkoxycarbonyl group, or —N($R_2$)$_2$, where $R_2$ may be hydrogen or an alkyl group, $R_1$ may be an alkyl group, an alkenyl group, an alkynyl group, an aryl group, an arylalkyl group, an alkylaryl group, an arylalkenyl group, an alkenylaryl group, an arylalkynyl group, an alkynylaryl group, halogen, an amino group, an amide group, an aldehyde group, an alkylcarbonyl group, a carboxy group, a mercapto group, a cyano group, a hydroxy group, an alkoxy group, an alkoxycarbonyl group, a sulfonyl group, a phosphoryl group, an acryloyloxy group, a methacryloyloxy group or an epoxy group, Q may be a single bond, an oxygen atom or —N($R_2$)—, where $R_2$ may be a hydrogen atom or an alkyl group, and m may be a number in a range of 1 to 3.

As the organosilane, at least one selected from the group consisting of the compounds represented by Formula 2 above can be used, where if one organosilane compound is used, crosslinking may be possible.

The organic silane may be selected, as an example, from the group consisting of methyl trimethoxysilane, methyl triethoxysilane, phenyl trimethoxysilane, phenyl triethoxysilane, dimethyl dimethoxysilane, dimethyl diethoxysilane, diphenyl dimethoxysilane, diphenyl diethoxysilane, phenyl dimethoxysilane, phenyl diethoxysilane, methyl dimethoxysilane, methyl diethoxysilane, phenylmethyl dimethoxysilane, phenylmethyl diethoxysilane, trimethyl methoxysilane, trimethyl ethoxysilane, triphenyl methoxysilane, triphenyl ethoxysilane, phenyldimethyl methoxysilane, phenyldimethyl ethoxysilane, diphenylmethyl methoxysilane, diphenylmethyl ethoxysilane, dimethyl ethoxysilane, dimethyl ethoxysilane, diphenyl methoxysilane, diphenyl ethoxysilane, 3-aminopropyl triethoxysilane, 3-glycidoxypropyl trimethoxysilane, p-aminophenylsilane, allyl trimethoxysilane, n-(2-aminoethyl)-3-aminopropyl trimethoxysilane, 3-aminopropyl triethoxysilane, 3-aminopropyl trimethoxysilane, 3-glycidoxypropyldiisopropyl ethoxysilane, (3-glycidoxypropyl)methyl diethoxysilane, 3-glycidoxypropyl trimethoxysilane, 3-mercaptopropyl trimethoxysilane, 3-mercaptopropyl triethoxysilane, 3-methacryloxypropylmethyl diethoxysilane, 3-methacryloxypropylmethyl dimethoxysilane, 3-methacryloxypropyl trimethoxysilane, n-phenylaminopropyl trimethoxysilane, vinylmethyl diethoxysilane, vinyl triethoxysilane, vinyl trimethoxysilane, and a mixture thereof, and used.

In another example, the intermediate layer may also be formed by polymerizing at least one selected from the group consisting of pentaerythritol triacrylate, hydroxyethyl acrylate, hydroxypropylacrylate, polyethyleneglycol monoacrylate, ethyleneglycol monoacrylate, hydroxybutylacrylate, glyxidoxymethacrylate, propyleneglycol monoacrylate, trimethoxysilylethyl epoxycyclohexane, acrylic acid and methacrylic acid.

As the epoxy resin applicable to the formation of the intermediate layer, at least one selected from the group consisting of an alicyclic epoxy resin and an aromatic epoxy resin can be used. As the alicyclic epoxy resin, for example, at least one selected from the group consisting of an alicyclic glycidyl ether type epoxy resin and an alicyclic glycidyl ester type epoxy resin can be used. Also, for example, 3,4-epoxycyclohexyl-methyl-3,4-epoxy cyclohexane carboxylate, which is Celloxide 2021P (Daicel Co.), and derivatives thereof can be used, which are stable even at high temperatures, colorless and transparent, and have excellent toughness, adhesion and adhesiveness for lamination. Especially, when used for coating, they have excellent surface hardness.

As the aromatic epoxy resin, for example, at least one aromatic epoxy resin selected from the group consisting of a bisphenol A type epoxy resin, a brominated bisphenol A type epoxy resin, a bisphenol F type epoxy resin, a bisphenol AD type epoxy resin, a fluorene-containing epoxy resin and triglycidyl isocyanurate can also be used.

The intermediate layer may be, for example, a coating layer formed by a sol-gel reaction. For example, at least one selected from the group consisting of SiOx (where, x is an integer of 1 to 4), SiOxNy (where, x and y are each an integer of 1 to 3), $Al_2O_3$, $TiO_2$, ZrO and ITO may also be included in the intermediate layer.

The intermediate layer may also comprise a metal alkoxide represented by the following Formula 3, or a condensation product thereof.

[Formula 3]

In Formula 3, M may be any one metal selected from the group consisting of aluminum, zirconium, and titanium, $R_3$ may be halogen, an alkyl group, an alkoxy group, an acyloxy group, or a hydroxy group, and z may be 3 or 4.

In one example, the intermediate layer may further comprise a filler. The filler can be used in consideration of, for example, adjusting the refractive index of the intermediate layer and/or adjusting the mechanical strength, and the like. In one example, as the filler, at least one selected from the group consisting of CaO, $CaF_2$, MgO, $ZrO_2$, $TiO_2$, $SiO_2$, $In_2O_3$, $SnO_2$, $CeO_2$, BaO, $Ga_2O_3$, ZnO, $Sb_2O_3$, NiO and $Al_2O_3$ can be used.

The method of forming the intermediate layer using the above materials is not particularly limited and known methods, for example, various dry and/or wet coating methods such as a deposition method and a sol-gel coating method, may be used depending on the materials to be used.

Also, before and/or after the modification treatment of the polysilazane layer, the preparation method of the present application may further comprise a step of forming a surface layer on the polysilazane layer or the modified polysilazane layer. This surface layer can act as a so-called dielectric layer and/or protective layer.

The materials for forming the surface layer are not particularly limited, and for example, a suitable material may be selected from various materials used for forming the above-described intermediate layer. In addition, the method of forming a surface layer may also be adopted as a suitable method in consideration of the type of the material to be selected.

The barrier film of the present application formed in the above-described manner has excellent barrier characteristics and thus can be effectively used in various applications, such as packaging materials of foods or medicines, and the like, members for FPDs (flat panel displays) such as LCDs (Liquid Crystal Displays) or solar cells, substrates for electronic papers or OLEDs (Organic Light Emitting Diodes), or sealing films. Particularly, the barrier film formed in the above-described manner has excellent optical performances such as transparency and thus can be effectively used in optical devices such as various display devices or lighting devices.

Advantageous Effects

The present application can provide a method for preparing a barrier film having excellent barrier characteristics and optical performances. The barrier film produced by the method of the present application can be effectively used not only for packaging materials of as foods or medicines, and the like, but also for various applications, such as members for FPDs (flat panel displays) such as LCDs (Liquid Crystal Displays) or solar cells, substrates for electronic papers or OLEDs (Organic Light Emitting Diodes), or sealing films.

MODE FOR INVENTION

Hereinafter, the preparation method of the present application will be described through Examples and Comparative Examples according to the present application, but the scope of the present application is not limited by the following examples.

Example 1

An intermediate layer having a thickness of about 900 nm was formed on the surface of a PET (poly(ethylene terephthalate)) film having a thickness of about 50 μm, using isocyanurate acrylate. Subsequently, a polysilazane solution (a solution prepared by adding about 4 parts by weight of dimethylethanolamine (DMEA), relative to 100 parts by weight of NN 120 solution, manufactured by AZ Electronics Materials) was coated on the intermediate layer to a thickness of about 120 nm or so. Then, a plasma discharge treatment was performed in a chamber. The discharge treatment was performed while injecting argon gas (discharge gas), water vapor, and oxygen gas (reaction gas) at flow rates of about 150 sccm, about 75 sccm and about 100 sccm, respectively (water vapor pressure: about 23.1%). At this time, the starting pressure of the chamber was set at about 250 mTorr and the pressure was maintained at about 254 mTorr or so during the process. The processing temperature in the process was about 114° C. or so. With regard to the power upon the plasma treatment, the power density per unit area of the electrode was set to be about 1 W/cm$^2$, and the processing energy was set to be about 12 J/cm$^2$, by performing the plasma treatment for about 12 seconds or so. A surface layer having a thickness of about 400 nm or so was formed on the surface of the modified polysilazane layer after the modification treatment (plasma treatment) with a known material, and then the water vapor transmission rate (WVTR) was measured to be about 1.94 mg/m$^2$day. Here, for the water vapor transmission rate, the measuring equipment (MOCON Aquatron 1) was performed in a known manner.

Example 2

A barrier film was prepared in the same manner as in Example 1, except that the water vapor injection flow rate was changed to about 100 sccm upon the plasma treatment (water vapor pressure: about 28.6%). The water vapor transmission rate (WVTR) was measured in the same manner as in Example 1 to be about 1.6 mg/m$^2$day.

Example 3

A barrier film was prepared in the same manner as in Example 1, except that the water vapor injection flow rate was changed to about 125 sccm upon the plasma treatment (water vapor pressure: about 33.3%). The water vapor transmission rate (WVTR) was measured in the same manner as in Example 1 to be about 1.18 mg/m$^2$day.

Example 4

A barrier film was prepared in the same manner as in Example 1, except that the water vapor injection flow rate was changed to about 90 sccm (water vapor pressure: about 26.5%) upon the plasma treatment and no surface layer was formed after the plasma treatment. The water vapor transmission rate (WVTR) was measured in the same manner as in Example 1 to be about 2.2 mg/m$^2$day.

Comparative Example 1

An intermediate layer having a thickness of about 900 nm was formed on the surface of a PET (poly(ethylene terephthalate)) film having a thickness of about 50 μm, using isocyanurate acrylate. Subsequently, the same polysilazane solution as used in Example 1 was coated on the intermediate layer to a thickness of about 120 nm. Then, the coating layer of the polysilazane solution was maintained in a constant temperature and humidity chamber at 85° C. and 85% relative humidity atmosphere for about 3 hours and subjected to a moisture-heat hardening treatment. A surface layer having a thickness of about 400 nm or so was formed on the surface of the modified polysilazane layer after the modification treatment (moisture-heat hardening treatment), and then the water vapor transmission rate (WVTR) was measured to represent a water vapor transmission rate of more than about 5,000 mg/m$^2$day Comparative Example 2

The polysilazane layer subjected to the moisture-heat hardening treatment in Comparative Example 1 was further subjected to a plasma treatment. The conditions where the plasma treatment was performed were the same as in Example 1, except that no water vapor was injected. A surface layer having a thickness of about 400 nm or so was formed on the surface of the modified polysilazane layer after the plasma treatment, and then the water vapor transmission rate (WVTR) was measured to be about 44 mg/m²day.

Comparative Example 3

A barrier film was prepared in the same manner as in Example 1, except that no water vapor was injected upon the plasma treatment (water vapor pressure: 0%). The water vapor transmission rate (WVTR) was measured in the same manner as in Example 1 to be about 2.6 mg/m²day.

The invention claimed is:

1. A method for preparing a barrier film comprising a base material film and a barrier layer on the base material film, and the barrier film having a water vapor transmission rate of from 0.005 mg/m²·day to 2 mg/m²·day at a temperature of 40° C. and a relative humidity of 90%, the method comprising:
forming a polysilazane layer on the base material film; and
modifying the polysilazane layer so as to be transformed into the barrier layer by plasma-treating the polysilazane layer in a processing space while injecting water vapor, a discharge gas, and a reaction gas into the processing space,
wherein:
a percentage of an injection flow rate of injected water vapor, relative to the total flow rate of gases injected into the processing space is maintained to be about 20% or more to about 50% or less during the plasma-treating, wherein the percentage of water vapor being injected is maintained by controlling flow rates of the water vapor, the discharge gas and the reaction gas and wherein the percentage of injected water vapor is determined by the formula 100×A/(A+B+C), the A, B and C being injection flow rates of the water vapor, the discharge gas, and the reaction gas, respectively, and each flow rate has a unit of sccm;
wherein a ratio (A/B) of the injection flow rate of the water vapor (A) to the injection flow rate of the discharge gas (B) is maintained at 0.4 or more, the injection flow rate of each having a unit of sccm, and
wherein a ratio (A/C) of an injection flow rate of the water vapor (A) to an injection flow rate of the reaction gas (C) is maintained at 0.4 or more, the injection flow rate of each having a unit of sccm.

2. The method for preparing a barrier film according to claim 1, wherein the polysilazane layer is formed by coating a polysilazane coating liquid on the base material film.

3. The method for preparing a barrier film according to claim 1, wherein the polysilazane layer comprises a polysilazane having units of the following Formula 1:

[Formula 1]

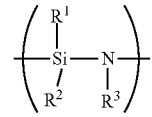

wherein R¹, R² and R³ are each independently a hydrogen atom, an alkyl group, an alkenyl group, an alkynyl group, an aryl group, an alkylsilyl group, an alkylamido group or an alkoxy group.

4. The method for preparing a barrier film according to claim 3, wherein each of $R^1$ to $R^3$ in Formula 1 is a hydrogen atom.

5. The method for preparing a barrier film according to claim 1, wherein the polysilazane layer has a thickness of 20 nm to 1,000 nm.

6. The method for preparing a barrier film according to claim 1, wherein the plasma treatment is carried out while maintaining a hydrogen partial pressure generated from the water vapor during processing in the processing space at $2.00\times10^{-5}$ Pa or more by controlling the injection flow rate of the water vapor in the processing space.

7. The method for preparing a barrier film according to claim 1, wherein a process pressure upon the plasma treatment is maintained in a range of 50 to 500 mTorr.

8. The method for preparing a barrier film according to claim 1, wherein an applied power density upon the plasma treatment is maintained at 0.2 W/cm² or more.

9. The method for preparing a barrier film according to claim 1, wherein an energy of the plasma treatment is maintained at 2 J/cm² or more.

10. The method for preparing a barrier film according to claim 1, wherein the base material film is a polymer film or a polymer film on at least one surface of which an intermediate layer comprising at least one resin selected from the group consisting of acrylic resin, urethane resin, melamine resin, alkyd resin, epoxy resin, siloxane polymer and condensation product of organosilane compound is formed, and wherein the plasma-treating is performed in a state where the polysilazane layer is in direct contact with the surface of the polymer film or the intermediate layer.

\* \* \* \* \*